United States Patent
Suzuki

(10) Patent No.: US 10,760,924 B2
(45) Date of Patent: Sep. 1, 2020

(54) POI INFORMATION PROVIDING SERVER, POI INFORMATION PROVIDING DEVICE, POI INFORMATION PROVIDING SYSTEM AND PROGRAM

(71) Applicant: Clarion Co., Ltd., Saitama-shi, Saitama (JP)

(72) Inventor: Kazumu Suzuki, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 256 days.

(21) Appl. No.: 15/543,707

(22) PCT Filed: Sep. 30, 2015

(86) PCT No.: PCT/JP2015/077808
§ 371 (c)(1),
(2) Date: Jul. 14, 2017

(87) PCT Pub. No.: WO2016/113957
PCT Pub. Date: Jul. 21, 2016

(65) Prior Publication Data
US 2018/0017408 A1    Jan. 18, 2018

(30) Foreign Application Priority Data
Jan. 16, 2015 (JP) .................. 2015-006641

(51) Int. Cl.
*G01C 21/36* (2006.01)
*G06F 16/29* (2019.01)
(Continued)

(52) U.S. Cl.
CPC ..... *G01C 21/3679* (2013.01); *G01C 21/3608* (2013.01); *G06F 16/00* (2019.01);
(Continued)

(58) Field of Classification Search
CPC combination set(s) only.
See application file for complete search history.

(56) References Cited

U.S. PATENT DOCUMENTS

| | | | |
|---|---|---|---|
| 6,374,180 B1 * | 4/2002 | Slominski | G01C 21/3611 340/988 |
| 2002/0138196 A1 * | 9/2002 | Polidi | G01C 21/3682 701/409 |

(Continued)

FOREIGN PATENT DOCUMENTS

| | | |
|---|---|---|
| EP | 2 642 249 A1 | 9/2013 |
| JP | 2001-201353 A | 7/2001 |

(Continued)

OTHER PUBLICATIONS

International Search Report (PCT/ISA/210) issued in PCT Application No. PCT/JP2015/077808 dated Dec. 22, 2015 with English translation (four pages).

(Continued)

*Primary Examiner* — Rami Khatib
(74) *Attorney, Agent, or Firm* — Crowell & Moring LLP

(57) ABSTRACT

It is possible to mitigate a load of POI search and provide non-overlapping POI information to a user. Included are: a communication unit which acquires a POI search request signal to request search of the POI from a POI information providing device; a memory unit which stores user utterance information storing a genre when voice information of user utterance specifying the genre of the POI is included in the POI search request signal; and a control unit which searches a POI of a genre specified by voice information when the voice information of user utterance specifying the genre of the POI is included in the POI search request signal, determines whether a predetermined POI search condition is satisfied when the voice information is not included in the POI search request signal, searches a POI of a genre (Continued)

specified by the user utterance information when the predetermined POI search condition is satisfied, and generates notification POI information including voice information relating to the searched POI.

9 Claims, 7 Drawing Sheets

(51) Int. Cl.
    *G06F 16/9537*      (2019.01)
    *G09B 29/00*      (2006.01)
    *G06Q 30/02*      (2012.01)
    *G06F 16/00*      (2019.01)

(52) U.S. Cl.
    CPC .......... *G06F 16/29* (2019.01); *G06F 16/9537* (2019.01); *G06Q 30/02* (2013.01); *G09B 29/00* (2013.01)

(56) References Cited

U.S. PATENT DOCUMENTS

| | | | | |
|---|---|---|---|---|
| 2003/0182057 | A1* | 9/2003 | Burt | G01C 21/3679 |
| | | | | 701/408 |
| 2004/0166832 | A1* | 8/2004 | Portman | G06Q 30/02 |
| | | | | 455/412.1 |
| 2010/0305842 | A1 | 12/2010 | Feng | |
| 2013/0073988 | A1* | 3/2013 | Groten | G06Q 30/02 |
| | | | | 715/753 |
| 2013/0304372 | A1* | 11/2013 | Mellert | G01C 21/3679 |
| | | | | 701/410 |
| 2014/0018101 | A1 | 1/2014 | Namba et al. | |

FOREIGN PATENT DOCUMENTS

| | | |
|---|---|---|
| JP | 2006-251298 A | 9/2006 |
| JP | 2007-205894 A | 8/2007 |
| WO | WO 2012/098651 A1 | 7/2012 |

OTHER PUBLICATIONS

Japanese-language Written Opinion (PCT/ISA/237) issued in PCT Application No. PCT/JP2015/077808 dated Dec. 22, 2015 (four pages).

Extended European Search Report issued in counterpart European Application No. 15877909.0 dated Oct. 9, 2018 (seven (7) pages).

* cited by examiner

FIG. 2

POI INFORMATION 310

| 311 | 312 | 313 | 314 | 315 | 316 | 317 |
|---|---|---|---|---|---|---|
| POI ID | POI NAME | COORDINATE POSITION | GENRE | ATTENTION DEGREE | ADDRESS | PHONE NUMBER |
| ** | **** | (*,*) | *** | ** | *** | ** |
| ** | **** | (*,*) | *** | ** | *** | ** |
| ** | **** | (*,*) | *** | ** | *** | ** |

USER UTTERANCE INFORMATION 320

| USER UTTERANCE | DATE AND TIME |
|---|---|
| * * * * * | * * * * |
| * * * * * | * * * * |
| * * * * * | * * * * |
| * * * * * | * * * * |

NOTIFICATION POI CANDIDATE LIST INFORMATION 340

341 342

| CANDIDATE No. | CANDIDATE POI |
|---|---|
| 1 | PUB C **BRANCH |
| 2 | PUB D **BRANCH |
| 3 | PUB A **BRANCH |
| 4 | PUB E **BRANCH |
| 5 | PUB B **BRANCH |

NOTIFICATION POI HISTORY INFORMATION 3 5 0

| GENRE | NOTIFICATION POI | DATE AND TIME |
|---|---|---|
| * * * | * * * * * | * * * * |
|  | * * * * * | * * * * |
|  | * * * * * | * * * * |
|  | * * * * * | * * * * |

351 352 353

.
.
.

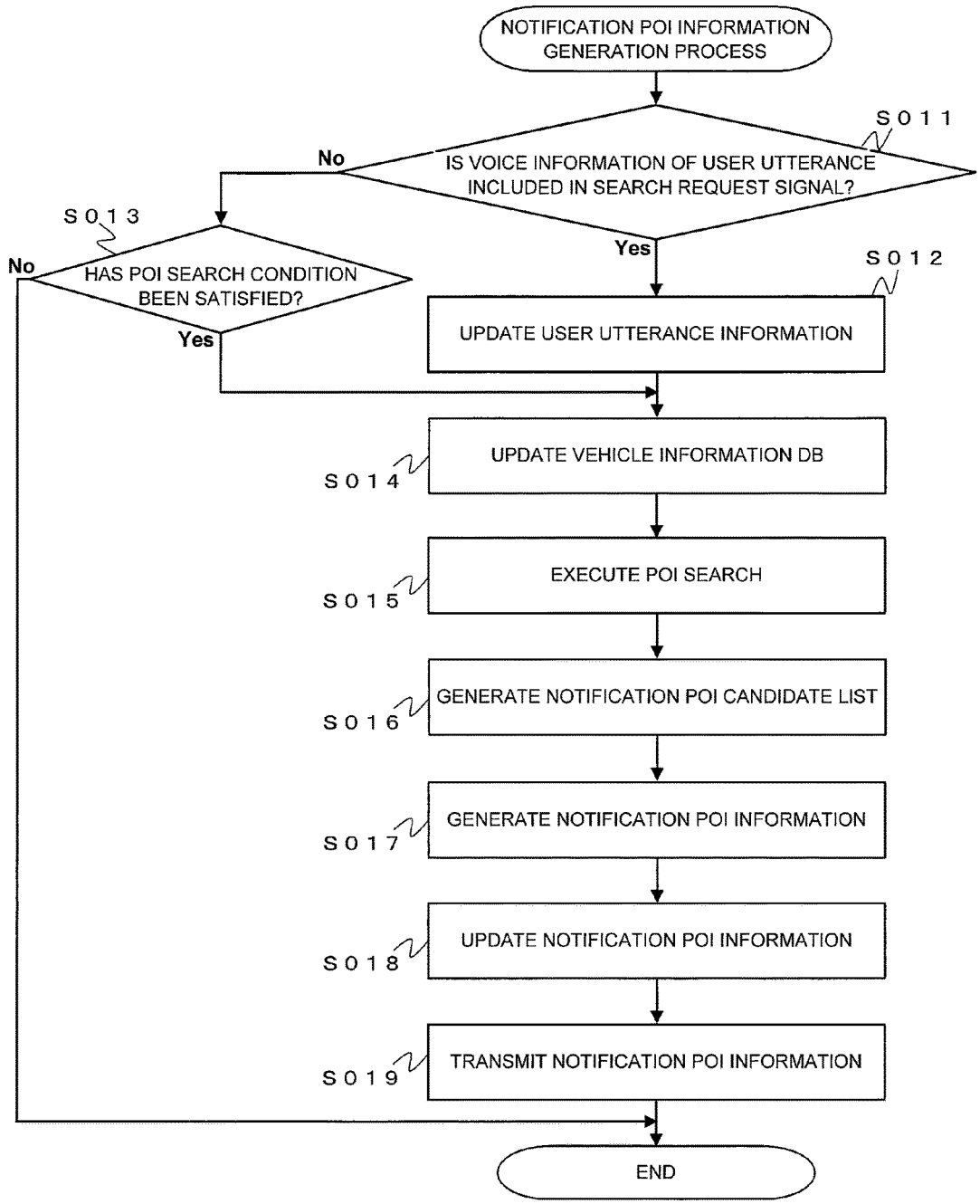

POI INFORMATION PROVIDING SERVER, POI INFORMATION PROVIDING DEVICE, POI INFORMATION PROVIDING SYSTEM AND PROGRAM

TECHNICAL FIELD

The present invention relates to a POI information providing server, a POI information providing device, and POI information providing system and program. This application is based upon and claims the benefit of priority from Japanese Patent Application No. 2015-006641, filed on Jan. 16, 2015; the entire contents of which are incorporated herein by reference.

BACKGROUND ART

Patent Literature 1 discloses a navigation device in which "a facility information creation unit that repeatedly searches a facility close to a current position of a vehicle, calculated by a vehicle position calculation unit, among facilities that belong to a genre designated by a user via a remote control unit, at a predetermined timing, and creates drawing data to display facility information, such as a position or a name of the searched facility, and the drawing data is input to an image composition unit and is superimposed on and composed withdrawing data of map information around the vehicle position, and a composite image thereof is displayed on a screen of a display device".

CITATION LIST

Patent Literature

Patent Literature 1: JP 2001-201353 A

SUMMARY OF INVENTION

Technical Problem

The navigation device in Patent Literature 1 repeatedly searches the facility close to the current position, and thus, repeatedly performs the search processing even in a case, for example, where there is no large change in the vehicle position and the facility to be searched is the same, thereby causing a large processing load, in some cases. In addition, there is a case where the user feels confusing and uncomfortable in the above-described navigation device since notification is repeatedly performed every time a facility is searched even the user has been already notified of the facility.

The present invention has been made in view of the above-described problems, and an object thereof is to provide a POI information providing server which is capable of mitigating a load of a point of interest (POI) search and providing non-overlapping POI information to a user.

Solution to Problem

In order to solve the above-described problems, a POI information providing server according to the present invention is a POI information providing server that provides information relating to a point of interest (POI), which is a facility on a map, and includes: a communication unit which acquires a POI search request signal to request search of the POI from a POI information providing device; a memory unit which stores user utterance information storing a genre when voice information of user utterance specifying the genre of the POI is included in the POI search request signal; and a control unit which searches a POI of a genre specified by voice information when the voice information of user utterance specifying the genre of the POI is included in the POI search request signal, determines whether a predetermined POI search condition has been satisfied when the voice information is not included in the POI search request signal, searches a POI of a genre specified by the user utterance information when the predetermined POI search condition has been satisfied, and generates notification POI information including voice information relating to the searched POI.

Advantageous Effects of Invention

According to the present invention, it is possible to mitigate the load of the POI search and provide the non-overlapping POI information to the user.

BRIEF DESCRIPTION OF DRAWINGS

FIG. 2 is a view illustrating an example of POI information according to the embodiment of the present invention.

FIG. 3 is a view illustrating an example of user utterance information according to the embodiment of the present invention.

FIG. 4 is a view illustrating an example of notification POI candidate list information according to the embodiment of the present invention.

FIG. 5 is a view illustrating an example of notification POI history information according to the embodiment of the present invention.

FIG. 7 is a flow diagram illustrating a flow of a notification POI information generation process according to the embodiment of the present invention.

DESCRIPTION OF EMBODIMENTS

Hereinafter, embodiments of the present invention will be described with reference to the drawings.

Figure 1:
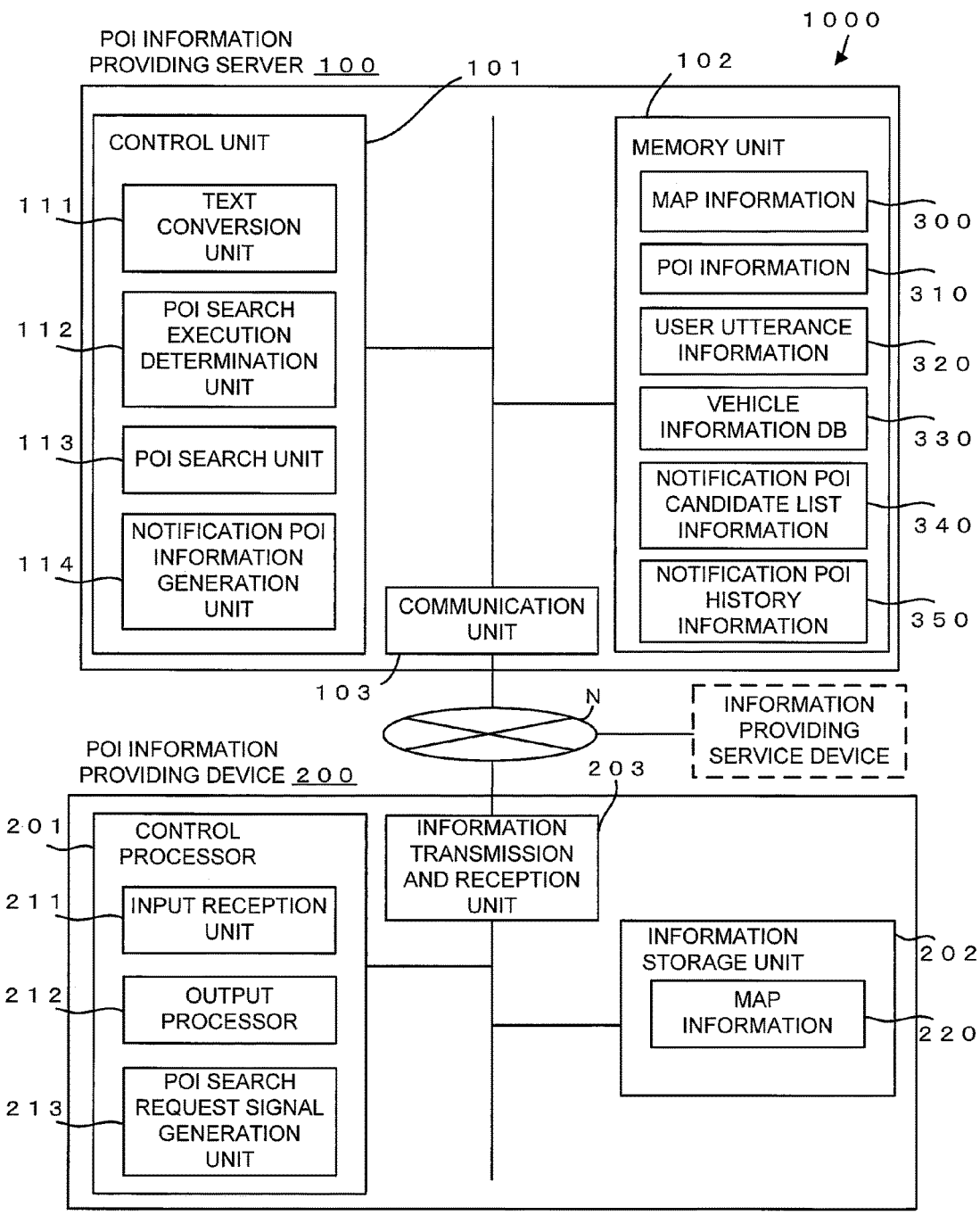
FIG. 1 is a diagram illustrating each example of a functional configuration of a point of interest (POI) information providing server and a POI information providing device and a schematic configuration of a POI information providing system according to an embodiment of the present invention.

FIG. 1 is a diagram illustrating each example of a functional configuration of a point of interest (POI) information providing server 100 and a POI information providing device 200 and a schematic configuration of a POI information providing system 1000 according to an embodiment. The POI information providing system 1000 includes the POI information providing server 100 which provides POI information to the POI information providing device 200, and the POI information providing device 200 which provides the POI information to a user. In addition, the POI information providing server 100 and the POI information providing device 200 are connected to each other to be communicable via a predetermined network N, for example, the Internet or the like. Incidentally, the POI information providing server 100 is connected to a predetermined information providing service device to be communicable in order to acquire POI information that has not been held from an external information providing service organization.

The POI information providing device 200 is implemented using, for example, a navigation device that is capable of implementing a so-called navigation function, such as specifying of a vehicle position on a map, display of the map or transportation information, and search of a recommended route and route guidance. Incidentally, the navigation device may be an in-vehicle navigation device that has been mounted on a vehicle in advance or may be a smartphone or a tablet computer in which an application to implement the navigation function has been installed. Hereinafter, a description will be given assuming a case where the POI information providing device 200 is implemented using the in-vehicle navigation device.

The POI information providing device 200 acquires a genre of a POI uttered by a user as voice information and transmits a POI search request signal including the voice information to the POI information providing server 100. In addition, the POI information providing device 200 generates the POI search request signal at a predetermined time interval (for example, once every five minutes) and transmits the generated POI search request signal to the POI information providing server 100. The POI information providing server 100 specifies a genre of a POI as a search target using the POI search request signal and the like, and performs search of a POI that belongs to the specified genre. In addition, the POI information providing server 100 generates notification POI information including information relating to the searched POI and transmits the generated notification POI information to the POI information providing device 200. The POI information providing device 200 notifies the user of the information relating to the searched POI as a voice using the notification POI information, and further, displays the information relating to the POI on the map in a superimposed manner.

Incidentally, the POI information providing server 100 according to the present invention performs the POI search only in a case where it is determined that a search condition of a POI has been satisfied. That is, the POI information providing server 100 can achieve mitigation of a processing load caused due to the POI search by omitting the unnecessary POI search. In addition, it is possible to prevent purchase of POI information, which is not held by the POI information providing server 100, from the external information providing service at a timing at which the POI search is unnecessary.

In addition, when a POI that is to be included in the notification POI information is the same as the POI that has been already notified to a user, the POI information providing server 100 generates notification POI information including information relating to another POI candidate that has been searched, and transmits the generated notification POI information to the POI information providing device 200. Accordingly, it is possible to avoid notification of the information relating to the POI which is the same as the POI that has been already notified, and to prevent the notification that makes the user feel uncomfortable.

Returning to FIG. 1, the functional configuration of the POI information providing server 100 will be described. The POI information providing server 100 includes a control unit 101, a memory unit 102, and a communication unit 103. In addition, the memory unit 102 stores map information 300, POI information 310, user utterance information 320, a vehicle information database (DB) 330, notification POI candidate list information 340, and notification POI history information 350.

The map information 300 is information to form the map. To be specific, the map information 300 includes link information relating to a road on the map, area information to identify an area on the map, and the like. In addition, for example, a link ID and link information of a road included in each mesh are associated with each other for each mesh ID to identify an area on the map, and are stored in the area information. In addition, the link information stores, for example, a location coordinates of a start node and an end node representing both ends of a road, road type information representing a type of the road such as a national road, a toll road, and a prefectural road, link length information representing a length of the road, link width information representing a width of the road, link orientation information representing an orientation of the road, travel time information representing a time required to pass the road, and start connection link/end connection link information storing link ID's of other roads connected to each of the start node and the end node of the road.

FIG. 2 is a view illustrating an example of the POI information 310. The POI information 310 includes various types of information relating to each POI. To be specific, the POI information 310 includes a record in which a POI ID 311, a POI name 312, a coordinate position 313, a genre 314, an attention degree 315, an address 316, and a phone number 317 are associated.

The POI ID 311 is information to uniquely identify a POI. The POI name 312 is information to specify a name of a POI, and also includes, for example, a branch name (for example, "X mart-Y station branch", and "X bank-Y street branch") for a store in the same series. The coordinate position 313 is information to specify a coordinate position of a POI on the map. The genre 314 is information to specify a genre of a POI (for example, a convenience store, a restaurant, a movie theater, a pharmacy, a bank, and the like). The attention degree 315 is information representing a degree of attention or popularity of a POI. The address 316 and the phone number 317 are information to specify, respectively, an address and a phone number of a POI.

FIG. 3 is a view illustrating an example of the user utterance information 320. The user utterance information 320 is history information in which the genre of the POI uttered by the user at the time of POI search is recorded. To be specific, the user utterance information 320 includes a record in which user utterance 321 and date and time 322 are associated.

The user utterance 321 is information to specify the genre of the POI uttered by the user. The date and time 322 is information to specify a date and time when the user uttered. Incidentally, when the POI search request signal includes voice information that specifies a genre of a POI, the user utterance information 320 is updated by the control unit 101, the genre specified by the voice information is registered.

The vehicle information DB 330 is a database that stores information relating to a vehicle which is a transmission source of the POI search request signal. To be specific, the vehicle information DB 330 stores vehicle information, such as a vehicle position, vehicle speed, and a vehicle orientation, at the time of transmitting the POI search request signal to be associated with each vehicle. Incidentally, the vehicle information DB 330 is updated by the control unit 101 in predetermined cases (for example, a case where the POI information providing server 100 acquires the POI search request signal including the voice information, and a case where it is determined to execute the POI search by the POI search execution determination unit 112).

The notification POI candidate list information 340 is information in which the searched POI is listed as a candidate of a POI to be notified to the user. FIG. 4 is a view illustrating an example of the notification POI candidate list information 340. The notification POI candidate list information 340 includes a record in which a candidate NO. 341 and a candidate POI 342 are associated.

The candidate NO. 341 is information representing a priority of a candidate to be notified to the user, and a high priority in notification is set sequentially from a candidate No. "1". The candidate POI 342 is information to specify a name of the POI candidate to be notified to the user. The notification POI candidate list information 340 is generated and updated by the control unit 101 after executing the POI search.

FIG. 5 is a view illustrating an example of the notification POI history information 350. The notification POI history information 350 is information relating to a history of the POI that has been already notified to the user. To be specific, the notification POI history information 350 includes a record in which the genre 351, the notification POI 352, and the date and time 353 are associated.

The genre 351 is information to specify the genre of the POI specified by the notification POI. The notification POI 352 is information to specify the name of the POI that has been already notified to the user. The date and time 353 is information to specify the date and time when the user has been notified of the POI. Incidentally, the notification POI history information 350 is generated and updated by the control unit 101 every time when the notification POI information is generated.

A description will be given returning to FIG. 1. The control unit 101 includes a text conversion unit 111, a POI search execution determination unit 112, a POI search unit 113, and a notification POI information generation unit 114.

The text conversion unit 111 is a functional unit that converts the voice information into text information. To be specific, when the POI search request signal acquired from the POI information providing device 200 includes the voice information that specifies the genre of the POI uttered by the user, the text conversion unit 111 converts the voice information into the text information using an existing voice recognition technique. In addition, the text conversion unit 111 registers information representing the genre of the POI converted into the text information in the user utterance information 320. In addition, the text conversion unit 111 updates the vehicle information DB 330 in the predetermined cases (the case where the POI search request signal including the voice information is acquired, and the case where it is determined to execute the POI search by the POI search execution determination unit 112).

The POI search execution determination unit 112 is a functional unit which determines whether to execute the POI search in the case of acquiring a POI search request signal that does not include voice information. To be specific, the POI search execution determination unit 112 determines whether the POI search condition has been satisfied at a point in time at which the POI search request signal that does not include the voice information is acquired.

To be more specific, the POI search execution determination unit 112 specifies a vehicle position and a vehicle orientation using vehicle information included in the POI search request signal. In addition, the POI search execution determination unit 112 sets a POI search area in a predetermined area in a vehicle front direction based on the specified vehicle position and vehicle orientation. For example, the POI search execution determination unit 112 sets a semi-circular area positioned in the vehicle front direction, as the POI search area, among a circular area having a predetermined radius (for example, 500 m) with the vehicle position as the center thereof. In addition, the POI search area may be a fan-shaped area which is formed in a case where a central angle of the semi-circular area positioned in the vehicle front direction is set between 30 and 150 degrees, for example. Incidentally, the shape and the like of the POI search area is not limited to the above-described example, but may be any shape and range as long as being set in the vehicle front direction.

In addition, when a POI search area set using a previous POI search request signal and a POI search area set using a latest POI search request signal do not overlap each other, the POI search execution determination unit 112 determines that the POI search condition has been satisfied. Incidentally, the POI search execution determination unit 112 may determine that the POI search condition has been satisfied when a distance between a vehicle position at the time of acquiring the previous POI search request signal and a vehicle position at the time of acquiring the latest POI search request signal is equal to or longer than a predetermined distance (for example, 500 m). Incidentally, the POI search execution determination unit 112 may determine that the POI search condition has been satisfied when an interval between the time of acquiring the previous POI search request signal and the time of acquiring the latest POI search request signal is equal to or longer than a predetermined time (for example, 10 minutes). That is, the POI search execution determination unit 112 determines whether the POI search condition has been satisfied based on traveling of a vehicle for a fixed interval (a distance interval or a time interval).

The POI search unit 113 is a functional unit which searches a POI. To be specific, when acquiring the POI search request signal including the voice information of the user utterance, the POI search unit 113 specifies a POI record, associated with the genre of the POI specified by the voice information, from the POI information 310. In addition, when acquiring the POI search request signal that does not include the voice information of the user utterance, the POI search unit 113 specifies the user utterance associated with a latest date and time from the user utterance information 320, and specifies the POI record associated with the genre represented by the specified user utterance from the POI information 310. In addition, the POI search unit 113 specifies the POI coordinate position from the corresponding record, and specifies a predetermined number (for example, ten) of POIs with the coordinate position included in the POI search area.

In addition, the POI search unit 113 generates the notification POI candidate list information 340 in which the specified POIs are arranged in the order of closeness to the current position of the vehicle.

A description will be given returning to FIG. 1. The notification POI information generation unit 114 is a functional unit which generates the notification POI information. The notification POI information generation unit 114 specifies a POI that is to be notified to the user at the time of generating the notification POI information. To be specific, the notification POI information generation unit 114 specifies a POI which is the closest to the current vehicle position, as a POI to be notified, among POIs that have not been notified to the user using the notification POI candidate list information 340 and the notification POI history information 350. To be more specific, the notification POI information generation unit 114 specifies a POI which is not included in the notification POI history information 350 and has the highest priority among POIs stored in the notification POI candidate list information 340. In addition, the notification POI information generation unit 114 generates notification POI information including information relating to the specified POI (for example, voice information that guides the POI coordinate position and the POI name), and transmits the generated notification POI information to the POI information providing device 200 via the communication unit 103.

In addition, the notification POI information generation unit 114 registers the POI that has been included in the notification POI information in the notification POI history information 350. In addition, when acquiring a signal notifying that an ignition key of the vehicle, which is the transmission source of the POI search request signal, has been turned off from the POI information providing device 200, the notification POI information generation unit 114 resets the user utterance information 320, the vehicle information DB 330, the notification POI candidate list information 340, and the notification POI history information 350 which are associated with the corresponding vehicle and stored in the memory unit 102.

The communication unit 103 is a functional unit which performs information communication with an external device (in the example, the POI information providing device 200 or the information providing service device). To be specific, the communication unit 103 receives the POI search request signal from the POI information providing device 200. In addition, the communication unit 103 transmits the notification POI information to the POI information providing device 200. In addition, the communication unit 103 performs the information communication with the information providing service device if necessary.

Next, the functional configuration of the POI information providing device 200 will be described. As illustrated in FIG. 1, the POI information providing device 200 includes a control processor 201, an information storage unit 202, and an information transmission and reception unit 203. In addition, the information storage unit 202 includes, for example, map information 220 which is similar to the map information 300 included in the memory unit 102 of the POI information providing server 100. In addition, the control processor 201 includes an input reception unit 211, an output processor 212, and a POI search request signal generation unit 213.

The input reception unit 211 is a functional unit which receives input of information and an instruction from the user, the external device, and the like. To be specific, the input reception unit 211 receives a POI search request instruction or the voice information of the user utterance representing the genre of the POI via an input device, such as a touch panel and a microphone, provided in the POI information providing device 200.

The output processor 212 is a functional unit which outputs various types of information and instructions to a predetermined functional unit or an output device and the external device provided in the POI information providing device 200 according to a type and content thereof. To be specific, the output processor 212 acquires the voice information that guides the POI name from the notification POI information and outputs the acquired voice information to a speaker. In addition, the output processor 212 specifies the POI coordinate position or the like from the notification POI information and generates screen information to display the POI to be superimposed on the map. In addition, the output processor 212 outputs the generated screen information to the output device (for example, the display).

The POI search request signal generation unit 213 is a functional unit which generates the POI search request signal at a predetermined timing. To be specific, the POI search request signal generation unit 213 generates a POI search request signal at a predetermined time interval (for example, once every five minutes) from the time of previously generating a POI search request signal and in the case of acquiring the voice information to specify the genre of the POI from the user.

To be more specific, when acquiring the voice information of the user, the POI search request signal generation unit 213 generates the POI search request signal including the corresponding voice information, and the vehicle information (for example, the current position, the vehicle orientation, the vehicle speed, and the like of the vehicle). In addition, in the case of generating the POI search request signal at the predetermined time interval (for example, once every five minutes) from the time of previously generating the POI search request signal, the POI search request signal generation unit 213 generates the POI search request signal that includes the vehicle information (without including the voice information). In addition, the POI search request signal generation unit 213 transmits the generated POI search request signal to the POI information providing server 100 via the information transmission and reception unit 203.

The information transmission and reception unit 203 is a functional unit that performs the information communication with the external device (in this example, the POI information providing server 100). To be specific, the information transmission and reception unit 203 receives the notification POI information from the POI information providing server 100. In addition, the information transmission and reception unit 203 transmits the POI search request signal to the POI information providing server 100.

The respective functional configurations of the POI information providing server 100 and the POI information providing device 200 have been described as above.

Figure 6:
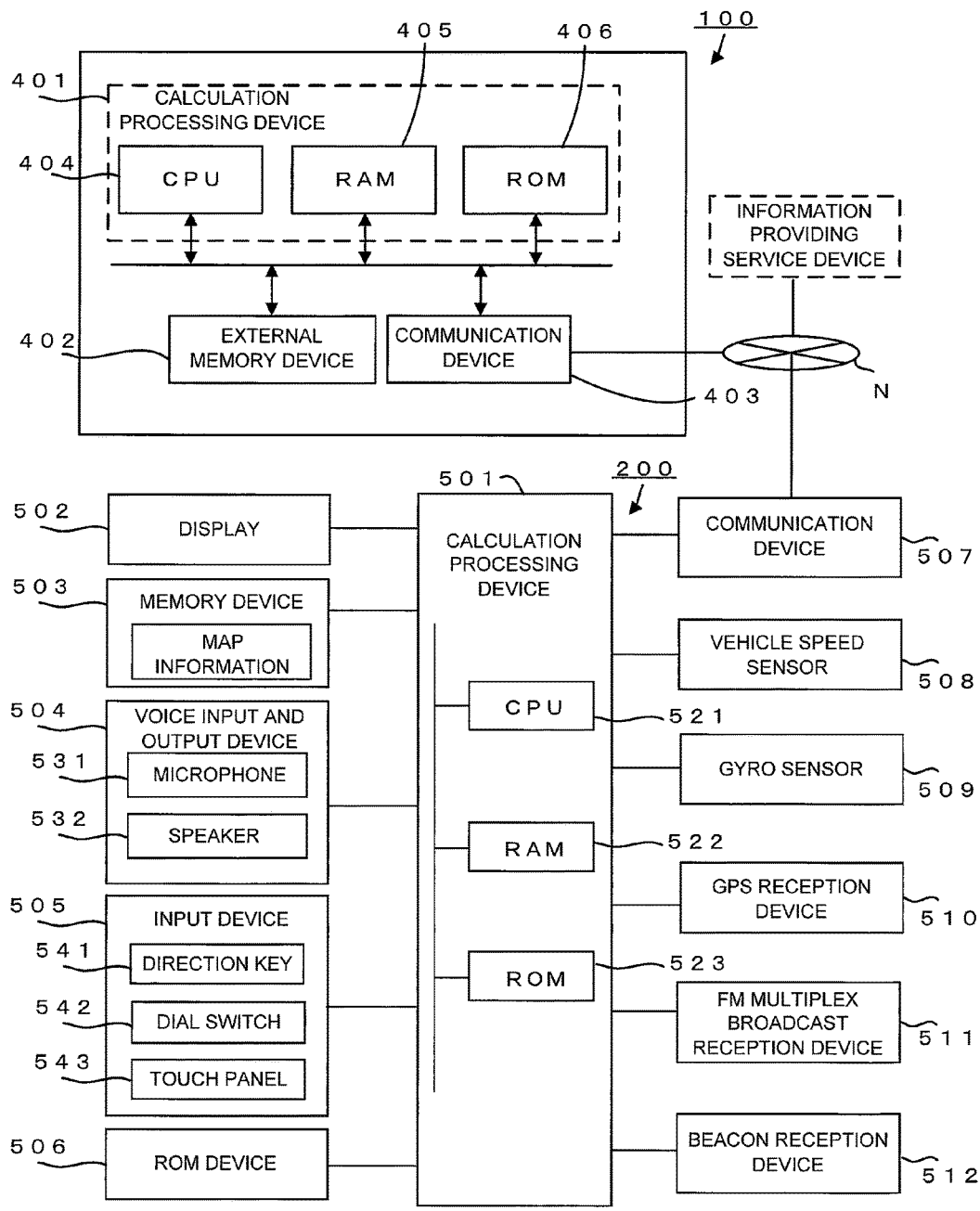
FIG. 6 is a view illustrating an example of each hardware configuration of the POI information providing server and the POI information providing device according to the embodiment of the present invention.

Next, each hardware configuration of the POI information providing server 100 and the POI information providing device 200 will be described. FIG. 6 is a view illustrating an example of each hardware configuration of the POI information providing server 100 and the POI information providing device 200.

The POI information providing server 100 is implemented using, for example, a calculator such as a general-purpose computer and a work station, but is not limited thereto, and may be implemented using, for example, a personal computer.

The POI information providing server 100 includes a calculation processing device 401, an external memory device 402, and a communication device 403.

The calculation processing device 401 includes a central processing unit (CPU) 404 that executes various types of processing, such as numerical calculation, and control of the respective devices and sensors, a random access memory (RAM) 405 that temporarily stores a program or data, a calculation result, and the like, and a read only memory (ROM) 406 that stores a program or data.

The external memory device 402 is a non-volatile memory device, for example, a hard disk device, a flash memory, and the like.

The communication device 403 is a device such as a communication module that performs information communication with the external device (in this example, the POI information providing device 200, the information providing service device, and the like).

Incidentally, the control unit 101 of the POI information providing server 100 illustrated in FIG. 1 is implemented using a program that causes the CPU 404 to execute the processing. This program is stored in the ROM 406 or the external memory device 402, is loaded on the RAM 405 for execution, and is executed by the CPU 404. Incidentally, the memory unit 102 of the POI information providing server 100 is implemented by any of the RAM 405, the ROM 406, and the external memory device 402 or a combination thereof. In addition, the communication unit 103 is implemented by the communication device 403.

Next, the hardware configuration of the POI information providing device 200 will be described. As described above, the POI information providing device 200 is implemented using the in-vehicle navigation device, but is not limited thereto, and may be implemented using, for example, a smartphone or a tablet computer in which an application to implement a navigation function has been installed.

The POI information providing device 200 includes a calculation processing device 501, a display 502, a memory device 503, a voice input and output device 504, an input device 505, a ROM device 506, a communication device 507, a vehicle speed sensor 508, a gyro sensor 509, a GPS reception device 510, an FM multiplex broadcast reception device 511, and a beacon reception device 512. In addition, these respective devices and sensors are configured to be capable of mutually exchanging data.

The calculation processing device 501 includes a CPU 521 that executes various types of processing, such as numerical calculation, and control of the respective devices and sensors, a RAM 522 that temporarily stores a program or data, a calculation result, and the like, and a ROM 523 that stores a program or data.

The display 502 is a unit that displays graphics information generated by the calculation processing device 501 in a display area, and is configured using a liquid crystal display, an organic EL display, or the like.

The memory device 503 is configured using a recording medium that is capable of at least read and write, for example, a hard disk drive (HDD), or a non-volatile memory card. In addition, predetermined information such as the map information 220 is stored in the memory device 503.

The voice input and output device 504 includes a microphone 531 serving as a voice input device and a speaker 532 serving as a voice output device. The microphone 531 acquires external voice of the POI information providing device 200 such as a sound issued by the user. In addition, the speaker 532 outputs voice information such as notification information to the user.

The input device 505 is a device configured to allow the POI information providing device 200 to receive a predetermined instruction from the user, and is configured of a direction key 541, a dial switch 542, a touch panel 543, and the like.

The ROM device 506 is configured using a recording medium that is capable of at least read, for example, a read only memory (ROM) such as a CD-ROM and a DVD-ROM, or an integrated circuit (IC) card. For example, video information, voice information, and the like are stored in the recording medium.

The communication device 507 is a device such as a communication module that performs information communication with the external device (in this example, the POI information providing server 100).

The vehicle speed sensor 508 converts detected rotational speed of a wheel into a pulse signal, and outputs predetermined information such as the number of pulse signals within a predetermined time. The gyro sensor 509 is configured using a fiber optic gyro, a vibration gyro, or the like, and detects angular velocity according to rotation of a moving body. The global positioning system (GPS) reception device 510 measures a current location, advancing speed, and an advancing orientation of a vehicle by receiving a signal from a GPS satellite and measuring a distance between the vehicle and the GPS satellite and a change rate of the distance for three or more satellites.

The FM multiplex broadcast reception device 511 receives FM multiplex broadcasting such as character information provided by a radio station as VICS information or FM multiplex general information. The beacon reception device 512 is a radio beacon that performs communication using a radio wave or an optical beacon that performs communication using light such as an infrared ray.

Incidentally, the control processor 201 of the POI information providing device 200 illustrated in FIG. 1 is implemented using a program that causes the CPU 521 to execute the processing. This program is stored in the ROM 523 or the memory device 503, is loaded on the RAM 522 for execution, and is executed by the CPU 521. Incidentally, the information storage unit 202 of the POI information providing device 200 is implemented by any of the RAM 522, the ROM 523, and the memory device 503 or a combination thereof. In addition, the information transmission and reception unit 203 is implemented by the communication device 507.

As above, the respective hardware configurations of the POI information providing server 100 and the POI information providing device 200 have been described.

[Description of Operation]

Next, a notification POI information generation process executed by the POI information providing server 100 will be described. FIG. 7 is a flow diagram illustrating a flow of the notification POI information generation process. This process is started by the POI information providing server 100 when the POI search request signal is acquired from the POI information providing device 200.

Prior to the notification POI information generation process, the POI information providing device 200 receives an execution instruction on the POI search from the user. To be specific, when receiving an instruction for the POI search via the input device 505, for example, the touch panel 543, the input reception unit 211 of the POI information providing device 200 receives the utterance of the user that specifies the genre of the POI via the microphone 531. In addition, the POI search request signal generation unit 213 generates a POI search request signal including the voice information uttered by the user and the vehicle information acquired via, for example, a controller area network (CAN), and transmits the generated POI search request signal to the POI information providing server 100 via the information transmission and reception unit 203.

In addition, after receiving the execution instruction on the POI search from the user, the POI information providing device 200 generates the POI search request signal at the predetermined time interval unless receiving a stop instruction for the generation. To be specific, the POI search request signal generation unit 213 generates the POI search request signal including the vehicle information (without including the voice information) at the predetermined time interval (for example, once every five minutes) from the time of previously generating the POI search request signal, and transmits the generated POI search request signal to the POI information providing server 100 via the information transmission and reception unit 203.

In this manner, when acquiring the POI search request signal transmitted from the POI information providing device 200, the POI information providing server 100 starts the notification POI information generation process. To be specific, the text conversion unit 111 determines whether the voice information of the user utterance is included in the POI search request signal (Step S011). In addition, when the voice information is included (Yes in Step S011), the text conversion unit 111 converts the corresponding voice information into the text information using the existing voice recognition technique. In addition, the text conversion unit 111 registers (updates) the information representing the genre of the POI converted into the text information in the user utterance information 320 (Step S012), and shifts the process to Step S014.

On the other hand, when the voice information of the user utterance is not included in the POI search request signal (No in Step S011), the POI search execution determination unit 112 determines whether the POI search condition has been satisfied (Step S013). To be specific, the POI search execution determination unit 112 specifies the vehicle information associated with the POI search request signal, previously acquired, from the vehicle information DB 330, and sets an old POI search area using the corresponding vehicle information. In addition, the POI search execution determination unit 112 sets a new POI search area using the vehicle information included in the latest POI search request signal that has been acquired at the time of starting this flow. In addition, when the new POI search area does not overlap the old POI search area, the POI search execution determination unit 112 determines that the POI search condition has been satisfied (Yes in Step S013), and shifts the process to Step S014. In addition, when the old POI search area and the new POI search area overlap each other, the POI search execution determination unit 112 determines that the POI search condition has not been satisfied (No in Step S013), and ends the process of this flow.

Next, the text conversion unit 111 registers (updates) the vehicle information included in the POI search request signal in the vehicle information DB 330 (Step S014).

Next, the POI search unit 113 executes the POI search (Step S015). To be specific, when the voice information of the user utterance is included in the POI search request signal acquired at the time of starting this flow, the POI search unit 113 specifies the POI record, associated with the genre of the POI specified by the voice information, from the POI information 310. In addition, when the voice information of the user utterance is not included in the POI search request signal acquired at the time of starting this flow, the POI search unit 113 specifies the user utterance associated with the latest date and time from the user utterance information 320, and specifies the POI record associated with the genre represented by the specified user utterance from the POI information 310. In addition, the POI search unit 113 specifies the POI coordinate position from the corresponding record, and specifies a predetermined number (for example, ten) of POIs with the coordinate position included in the POI search area.

Next, the POI search unit 113 generates the notification POI candidate list information 340 in which the specified POIs are arranged in the order of closeness to the current position of the vehicle (Step S016).

Next, the notification POI information generation unit 114 generates the notification POI information (Step S017). To be more specific, the POI which is not included in the notification POI history information 350 and has the highest priority is specified among the POIs stored in the notification POI candidate list information 340. In addition, the notification POI information generation unit 114 generates the notification POI information including information relating to the specified POI (for example, voice information that guides the POI coordinate position and the POI name).

Incidentally, when even a single POI has not been searched in the process in Step S015, that is, when no POI serving as a candidate is stored in the notification POI candidate list information 340, the notification POI information generation unit 114 may be configured to generate notification POI information including a message that there is no POI that needs to be notified.

Next, the notification POI information generation unit 114 registers (updates) the POI that has been included in the notification POI information in the notification POI history information 350 (Step S018).

Next, the notification POI information generation unit 114 transmits the generated notification POI information to the POI information providing device 200 via the communication unit 103 (Step S019), and ends the process of this flow.

As above, the notification POI information generation process according to the present invention has been described. According to the POI information providing server 100 that performs the above-described process, it is possible to mitigate the load of the POI search and to provide the non-overlapping POI information to the user. In particular, the POI information providing server 100 determines whether to execute the search based on the overlapping of the search area even when the POI search is regularly requested from the POI information providing device 200. Thus, even when the POI search request is received in a case where the vehicle position does not significantly change due to congestion or the like, it is possible to avoid useless search and obtain the mitigation of the processing load. On the other hand, when the voice information is included in the POI search request signal, that is, when the user has uttered regarding the genre of the POI, it is possible to consider that it is a timing at which the user tries to search a POI of a new genre. In such a case, the POI information providing server 100 executes the POI search without determining whether to execute the POI search, and transmits a result of the search to the POI information providing device 200.

In addition, the POI information providing server 100 generates notification POI information including information relating to a POI having a high priority other than the POIs, which have been already notified to the user, among the searched POIs, and transmits the generated notification POI information to the POI information providing device 200. Thus, even if the POI that has been notified to the user is searched with the highest priority, it is possible to notify the user of a POI having a second highest priority without repeatedly notifying the user of the same POI.

Incidentally, the present invention is not limited to the above-described embodiment, and includes various modified examples. For example, the POI information providing device 200 according to a first modified example receives designation on a genre that is desirably searched again among genres uttered by the user in the past, and generates a genre selection signal to request the POI information providing server 100 to search a POI of the selected genre.

To be more specific, the control processor 201 of the POI information providing device 200 converts user utterance into text information and stores the converted information in the information storage unit 202 for a predetermined period (for example, until the ignition key is turned off). In addition, when receiving a selection instruction on a genre of a POI uttered in the past from the user via the input device such as the touch panel, the control processor 201 displays the corresponding text information on the display and receives selection by the user. In addition, the control processor 201 generates a genre selection signal including the text information of the genre selected by the user and transmits the generated genre selection signal to the POI information providing server 100. The POI information providing server 100 which has acquired the genre selection signal searches a POI of the genre included in the corresponding signal, and executes the above-described processes in Step S016 to S018.

According to the above-described POI information providing device 200, the user can search the genre of the POI uttered in the past again using a relatively simple method.

In addition, the POI information providing server 100 according to a second modified example generates notification POI information including voice information relating to a POI that is to be newly notified and voice information representing that a notified POI is the POI that has been already notified, and transmits the generated notification POI information to the POI information providing device 200.

When the user is prevented from being repeatedly notified of the notified POI, for example, the user who finds out a store corresponding to the notified POI during traveling may wonder why the corresponding store has not been notified as the latest POI information, which causes misunderstanding. Thus, the POI information providing server 100 according to the present modified example causes the voice information with content representing that the POI that has been already notified to be included in the notification POI information for the notified POI in order to prevent the misunderstanding of the user. For example, when the notification POI candidate list information 340 in FIG. 4 is generated, voice guidance, such as "There Is A Pub D Near Here. Further, There Is A Pub C That Has Been Already Notified Near Here", is performed.

The notification POI information generation unit 114 of the POI information providing server 100 according to the present modified example specifies a notification POI stored in the notification POI history information 350 in Step S017 described above. In addition, the notification POI information generation unit 114 generates voice information having content to deliver that the notified POI which has been specified is present in the vicinity thereof together with the POI which is to be newly notified, and generates notification POI information including this voice information. In addition, the notification POI information generation unit 114 transmits the generated notification POI information to the POI information providing device 200 via the communication unit 103.

According to the above-described POI information providing server 100, it is possible to avoid the generation of misunderstanding caused when the store in front of the user is not guided.

In addition, the POI information providing server 100 which has acquired the POI search request signal determines whether to execute the POI search in the above-described embodiment. In a third modified example, however, the POI information providing device 200 controls a transmission timing of the POI search request signal to achieve mitigation of a processing load of the POI information providing server 100.

To be specific, the POI search request signal generation unit 213 stores a genre of a POI, specified by user utterance in the past, in the information storage unit 202 as user utterance history information. In addition, the POI search request signal generation unit 213 controls the transmission timing of the POI search request signal, and thus, determines whether the above-described POI search condition has been satisfied at a predetermined timing (for example, every one minute). In addition, the POI search request signal generation unit 213 generates a POI search request signal using the user utterance history information and transmits the generated POI search request signal to the POI information providing server 100 only when it is determined that the corresponding condition has been satisfied.

Incidentally, the POI information providing server 100 according to the above-described embodiment determines whether the POI search condition has been satisfied and executes the POI search when the POI search request signal does not include the voice information, but the POI search is executed by the POI search unit 113 at the time of receiving the POI search request signal regardless of whether the voice information is included in the POI search request signal in the POI information providing server 100 according to the present modified example. It is because it is unnecessary for the POI information providing server 100 to perform determination again since whether the search condition has been satisfied is completely determined by the POI information providing device 200.

According to the above-described POI information providing device 200, it is possible to further mitigate the processing load relating to the POI search executed by the POI information providing device 200.

Incidentally, the functional configurations of the POI information providing server 100 and the POI information providing device 200 have been classified according to the main processing content in order to facilitate the understanding on each function of the POI information providing server 100 and the POI information providing device 200 implemented in the above-described embodiment and modified examples, and the present invention is not limited by the way of classifying the respective functions or names thereof. In addition, each configuration of the POI information providing server 100 and the POI information providing device 200 can be also classified into more constituent elements according to the processing content. In addition, it may be classified such that one constituent element executes more processing.

In addition, the present invention is not limited to the above-described embodiments, but includes various modified examples. For example, the above-described embodiments have been described in detail to describe the present invention to be easily understandable, and the present invention is not necessarily limited to embodiments including all the configurations that have been described. In addition, a part of a configuration in a certain embodiment can be substituted with a configuration in another embodiment, and further, a configuration in another embodiment can be added to a configuration in a certain embodiment. In addition, a part of a configuration in each embodiment can be added or substituted with another configuration or removed.

REFERENCE SIGNS LIST

1000 POI information providing system
100 POI information providing server
101 control unit
102 storage unit
103 communication unit
111 text conversion unit
112 POI search execution determination unit
113 POI search unit 114 notification POI information generation unit
200 POI information providing device
201 control processor
202 information storage unit
203 information transmission and reception unit
211 input reception unit
212 output processor
213 POI search request signal generation unit
220 (300) map information
310 POI information
320 user utterance information
330 vehicle information DB
340 notification POI candidate list information
350 notification POI history information

The invention claimed is:

1. A POI information providing server that provides information relating to a point of interest (POI), which is a facility on a map, the POI information providing server comprising:
a communication device which acquires a POI search request signal to request search of the POI from a POI information providing device;
a memory which stores user utterance information storing a genre of the POI, indicating a type of business located at the POI, based on voice information of a user utterance specifying the genre of the POI included in the POI search request signal; and
a CPU programmed to search the POI of the genre specified by the voice information in a case that the voice information of user utterance specifying the genre of the POI is included in the POI search request signal, determine whether a predetermined POI search condition is satisfied in a case that the voice information is not included in the POI search request signal, search the POI of the genre specified by the user utterance information when the predetermined POI search condition is satisfied, and generate notification POI information including voice information relating to the searched POI,
wherein the CPU is programmed to specify, according to predetermined rules, a POI which is closest to a current vehicle position and which has not been notified to the user as a POI that has a highest priority among searched POI candidates other than a POI previously included in the notification POI information, and generate notification POI information that includes voice information relating to the specified POI, and
wherein the POI information providing server determines whether to execute the search based on whether a new POI search area overlaps an old POI search area even when the search is regularly requested from the POI information providing device.

2. The POI information providing server according to claim 1, wherein
the POI search request signal includes vehicle information which specifies a position and an orientation of a vehicle equipped with the POI information providing device, and
the CPU sets the old POI search area using the vehicle information included in the POI search request signal, previously acquired, in the case that the POI search request signal does not include the voice information, sets the new POI search area using the vehicle information included in the POI search request signal currently acquired, and determines that the POI search condition is satisfied in a case that the old POI search area and the new POI search area do not overlap each other.

3. The POI information providing server according to claim 1, wherein
the POI search request signal includes vehicle information which specifies a position and an orientation of a vehicle equipped with the POI information providing device, and
the CPU specifies a vehicle position at a time of previously acquiring the POI search request signal using the vehicle information included in the POI search request signal, previously acquired, in the case that the POI search request signal does not include the voice information, specifies a vehicle position at a time of currently acquiring the POI search request signal using the vehicle information included in the POI search request signal currently acquired, and determines that the POI search condition is satisfied in a case that the vehicle position at the time of previously acquiring the POI search request signal and the vehicle position at the time of currently acquiring the POI search request signal are separated from each other by a predetermined distance or longer.

4. The POI information providing server according to claim 1, wherein
in the case that the POI search request signal does not include the voice information, the CPU determines that the POI search condition is satisfied in a case where an interval from a time at which the POI search request signal is previously acquired to a time at which the POI search request signal is currently acquired is a predetermined time or longer.

5. The POI information providing server according to claim 1, wherein
when the communication device acquires a genre selection signal, which specifies the genre of the POI uttered by a user in a past, from the POI information providing device, the CPU specifies a genre to be specified by the genre selection signal from the user utterance information, and searches a POI of the specified genre.

6. The POI information providing server according to claim 1, wherein
the notification POI information further includes voice information relating to an already-notified POI.

7. A POI information providing device that provides information relating to a point of interest, which is a facility on a map, to a user, the POI information providing device comprising:
a memory which stores a genre of the POI, indicating a type of business located at the POI, specified by a past user utterance as user utterance history information; and
a CPU programmed to generate a POI search request signal to request search of a POI of a genre to be specified by the user utterance history information in a case of acquiring voice information of the user utterance or in a case of a predetermined POI search condition being satisfied being determined at a predetermined timing and the predetermined POI search condition being satisfied,
wherein the CPU is programmed to specify, according to predetermined rules, a POI which is closest to a current vehicle position and which has not been notified to the user as a POI that has a highest priority among searched POI candidates other than a POI previously included in notification POI information, and generate notification POI information that includes voice information relating to the specified POI, and wherein a POI information providing server determines whether to execute the search based on whether a new POI search area overlaps an old POI search area even when the search is regularly requested from the POI information providing device.

8. A POI information providing system comprising:

a POI information providing server that provides information relating to a point of interest (POI) which is a facility on a map; and a POI information providing device that provides the information relating to the POI acquired from the POI information providing server to a user, wherein the POI information providing device comprises a first CPU programmed to generate a POI search request signal to request search of a POI including voice information of user utterance that specifies a genre of the POI, indicating a type of business located at the POI, or the POI search request signal which does not include the voice information, the POI information providing server comprises:

a communication device which acquires the POI search request signal from the POI information providing device;

a memory which stores user utterance information storing a genre in a case that the voice information of the user utterance specifying the genre of the POI is included in the POI search request signal; and a second CPU programmed to search a POI of the genre specified by the voice information in the case that the voice information of the user utterance specifying the genre of the POI is included in the POI search request signal, determine whether a predetermined POI search condition is satisfied in a case that the voice information is not included in the POI search request signal, search a POI of the genre specified by the user utterance information in a case that the predetermined POI search condition is satisfied, and generate notification POI information including voice information relating to the searched POI, wherein the second CPU is programmed to specify, according to predetermined rules, a POI which is closest to a current vehicle position and which has not been notified to the user as a POI that has a highest priority among searched POI candidates other than a POI previously included in the notification POI information, and generate notification POI information that includes voice information relating to the specified POI, and wherein the POI information providing server determines whether to execute the search based on whether a new POI search area overlaps an old POI search area even when the search is regularly requested from the POI information providing device.

9. A non-transitory computer-readable medium storing a program that causes a computer to function as a POI information providing server providing information relating to a point of interest (POI), which is a facility on a map, the program causing the computer to function as:

a communication device which acquires a POI search request signal to request search of the POI from a POI information providing device;

a memory which stores user utterance information storing a genre of the POI, indicating a type of business located at the POI, in a case that voice information of user utterance specifying the genre of the POI is included in the POI search request signal; and a CPU programmed to search a POI of a genre specified by voice information in the case that the voice information of user utterance specifying the genre of the POI is included in the POI search request signal, determine whether a predetermined POI search condition has been satisfied in a case that the voice information is not included in the POI search request signal, search a POI of a genre specified by the user utterance information in a case that the predetermined POI search condition has been satisfied, and generate notification POI information including voice information relating to the searched POI, wherein the CPU is programmed to specify, according to predetermined rules, a POI which is closest to a current vehicle position and which has not been notified to the user as a POI that has a highest priority among searched POI candidates other than a POI previously included in the notification POI information, and generate notification POI information that includes voice information relating to the specified POI, and wherein the POI information providing server determines whether to execute the search based on whether a new POI search area overlaps an old POI search area even when the search is regularly requested from the POI information providing device.

* * * * *